US011968331B2

(12) United States Patent
Bouvet

(10) Patent No.: US 11,968,331 B2
(45) Date of Patent: Apr. 23, 2024

(54) TERMINAL IMPLEMENTING A COMMUNICATION METHOD, AND SERVER IMPLEMENTING A METHOD FOR ESTABLISHING A COMMUNICATION BETWEEN TWO TERMINALS

(71) Applicant: Orange, Issy-les-Moulineaux (FR)

(72) Inventor: Bertrand Bouvet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/749,787

(22) Filed: May 20, 2022

(65) Prior Publication Data

US 2022/0377178 A1    Nov. 24, 2022

(30) Foreign Application Priority Data

May 21, 2021  (FR) ...................................... 21 05348

(51) Int. Cl.
*H04M 3/42*        (2006.01)
*H04M 7/00*        (2006.01)
(Continued)

(52) U.S. Cl.
CPC ..... *H04M 7/0075* (2013.01); *H04M 3/42059* (2013.01); *H04W 40/02* (2013.01); *H04W 40/246* (2013.01)

(58) Field of Classification Search
CPC ........... H04M 7/0075; H04M 3/42059; H04W 40/02; H04W 40/246
(Continued)

(56) References Cited

U.S. PATENT DOCUMENTS

2014/0156858 A1   6/2014  Riordan et al.
2019/0349209 A1*  11/2019 Badar ................. H04L 65/1069
2021/0029616 A1*  1/2021  Faus Gregori ...... H04L 65/1104

FOREIGN PATENT DOCUMENTS

EP       3 471 379 A1     4/2019
EP        3471379 A1  *  4/2019    ......... H04L 61/2596
WO    WO 2019/243716 A1   12/2019

OTHER PUBLICATIONS

French Search Report dated Jan. 19, 2021 for Application No. FR2105348.

(Continued)

*Primary Examiner* — Ahmad F. Matar
*Assistant Examiner* — Jirapon Tulop
(74) *Attorney, Agent, or Firm* — Knobbe, Martens, Olson & Bear, LLP

(57) ABSTRACT

Methods and devices for establishing a communication between a first and a second terminal are described. The disclosed technology can be implemented in or by a server or a terminal in communication with the server. The first terminal can to the server, using a first calling identity, a request including connection information and an identifier of the first terminal. Using the identifier, the server can obtain from a database a pair of calling identities including one certified and one non-certified, the pair comprising the first calling identity and a second calling identity. The server can determine, from one of the calling identities and from the connection information, a connectivity mode of the terminal, and determine a routable number on which the terminal can send a communication to the server. The server can route the communication towards the second terminal by presenting a calling identity of the pair and sending the routable number to the first terminal.

15 Claims, 9 Drawing Sheets

(51) Int. Cl.
*H04W 40/02* (2009.01)
*H04W 40/24* (2009.01)

(58) Field of Classification Search
USPC .......................................................... 455/417
See application file for complete search history.

(56) References Cited

OTHER PUBLICATIONS

Kaplan Acme Packet H: "Problems with the SIP Globally Routable User Agent URis (GRUUs); draft-kaplan-dispatch-gruu-problematic-00.txt", Problems With the SIP Globally Routable User Agent URIS (GRUUs); Draft-Kaplan-Dispatch-Gruu-Problematic-00.Txt, Internet Engineering Task Force, IETF; StandardWorkingDraft, Internet Society (ISOC) 4, Rue Des Falaises CH-1205 Geneva, Switzerland, Oct. 18, 2010 (Oct. 18, 2010), pp. 1-11, XP015071838, [extrait le Oct. 18, 2010].

* cited by examiner

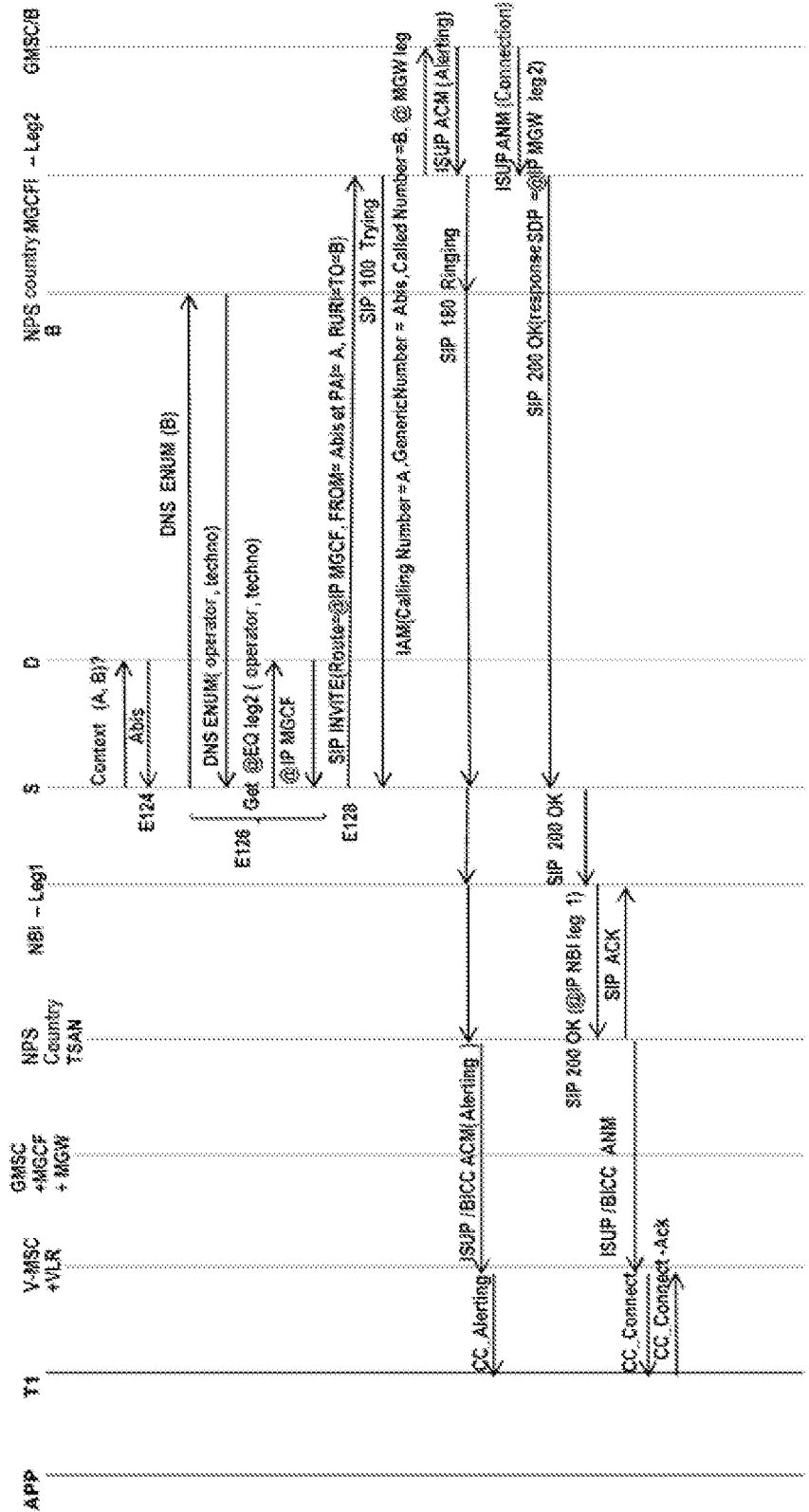
FIG. 3bis

TERMINAL IMPLEMENTING A COMMUNICATION METHOD, AND SERVER IMPLEMENTING A METHOD FOR ESTABLISHING A COMMUNICATION BETWEEN TWO TERMINALS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority under 35 U.S.C. § 119(a) to French Patent Application No. FR 21 05348, filed May 21, 2021, the entire disclosure of which is incorporated by reference in its entirety.

BACKGROUND

Technical Field

The disclosed technology relates to the general field of telecommunications. More specifically, the disclosed technology relates to the establishment of a communication by a terminal by using, according to a criterion selected by a user of the terminal, a certified calling identity or a non-certified calling identity of the terminal.

Description of the Related Art

Telephone operators offer their subscribers a service allowing a terminal, according to the user's choice, to emit (or receive) communications by using a certified calling identity, associated with a module for authenticating the terminal such as a SIM or eSIM card (Subscriber Identity Module and embedded SIM), or a non-certified calling identity.

This service is particularly interesting for a user in a telework situation or on a business trip.

This service allows him to make calls by using his mobile telephone while presenting to the recipient a non-certified calling identity of the telephone which corresponds to a business number for example a fixed number of his company, and not the certified calling identity of the mobile telephone. A software application is installed on the telephone to allow the emission of the communications by using the certified calling identity or the non-certified calling identity, according to the user's choice.

An incoming call initially intended for the company number that corresponds to the non-certified identity of the mobile telephone can be forwarded to the certified identity of the telephone, the user can thus receive this call on his mobile telephone. Particularly, the presentation on the mobile telephone of the calls made to the certified identity can be different from the presentation of the calls made to the non-certified identity of the telephone (i.e. calls initially intended for the company number and forwarded to the certified identity of the telephone), for example by using a different ringtone or by displaying a different wallpaper. A software application is installed on the telephone to manage the presentation of the calls according to their initial destinations.

FIG. 1 describes an architecture of a communication network, in which methods of the state of the art are implemented to allow a terminal TA connected to the network in circuit mode to emit a communication by using a non-certified calling identity Abis or a certified calling identity A, and to allow the terminal to receive a communication emitted to the non-certified identity Abis.

The network illustrated is a second or third generation (2G or 3G) cellular network and includes a cellular access network RAN (Radio Access Network). As known, the illustrated network includes equipment of the GGSN (GPRS Gateway Service Node) type, equipment of the SGSN (Serving Gateway Service Node) type, a visited mobile switch of the V-MSC (Visited Mobile Switch Center) type comprising a module of the VLR (Visited Location Register) type, and equipment comprising a database of the HLR (Home Location Register) type. To implement the service, the network further includes a platform P using the intelligent network protocol CAMEL (Customized Applications for Mobile Network Enhanced Logic) or INAP (Intelligent Network Application Part), and a platform of management of the service by the operator, denoted IS for "Information System".

The terminal TA includes an authentication module, for example a SIM or eSIM card, to which the certified calling identity A is assigned by the network operator, such as an identity of the MSISDN (Mobile Station International Subscriber Directory Number) type. The terminal TA can be a mobile telephone.

The HLR database and the platform P are part of the home network of the terminal TA, i.e. the network managed by the operator having assigned the certified calling identity A. This home network is referred to as "Home" network. The V-MSC switch can be managed by the operator of the home network or by an operator of a visited network if the terminal TA is in a roaming situation.

Numerical references shown in FIG. 1 illustrate exchanges between the different pieces of equipment of the network, which represent steps ETXi of a method of an alternate implementation that allows emitting outgoing communications by using the certified calling identity A or the non-certified calling identity Abis, and steps ERXj of a method of an alternate implementation that allow receiving incoming communications intended for the non-certified identity Abis.

Emission by the Terminal TA of a Communication by Using the Non-Certified Identity Abis of this Terminal:

During a step ETX1a, the platform IS provisions in the HLR database a mark to trigger the CAMEL intelligent network platform P implementing the service for the outgoing communications from the terminal TA.

During a step ETX1b, the platform IS provisions in a MEM database accessible by the platform P the certified calling identity A of the mobile terminal TA and the non-certified calling identity Abis corresponding to a fixed or mobile number with which the terminal TA is authorized to emit an outgoing communication and present this identity Abis to a called terminal TB. Other information can also be provisioned in the platform IS, for example to authorize or not some called destinations, or to authorize or not the use of this service on certain days of the week or during a given time slot.

It is assumed that the terminal TA connects to the network during a step ETX2, for example following an activation of the terminal or a deactivation of airplane mode on the terminal.

During a step ETX3, the VLR module of the V-MSC mobile switch downloads the profile attached to the authentication module of the terminal TA from the HLR database. The VLR module thus obtains the trigger mark of the CAMEL intelligent network platform P for the outgoing communications from the terminal TA. This trigger mark includes particularly:

a trigger point, for example of the IDP-2 (Initial Detection Point-State 2) type, with reference to an automatic call machine of the O-BCSM (Originating Basic Call State Machine) type standardized and processed by the V-MSC switch;

an address of the platform P processing the service; and possibly the name of the service to be executed by the platform P if the latter processes several services.

During a step ETX4, the user of the terminal TA triggers the software application dedicated to the service, for example the application "Orange Telephone Pro" of the operator Orange in France (registered trademarks). The user selects a module that allows emitting an outgoing communication by using the non-certified calling identity Abis. The user dials a called number B of the terminal TB.

During a step ETX5a, the application installed on the terminal TA sends a request, for example of the HTTPS (Hyper Text Transfer Protocol Secured) type towards the platform P, the address of the platform P being preconfigured in the application. This request contains the called number B and a technical identifier that allows identifying the pair of the identities A and Abis.

After receiving the request, the platform P consults the MEM database to verify that the service is authorized for the terminal TA and that the called number B is authorized. If this is the case, the platform P sends during a step ETX5b a positive response to the application, for example by sending an HTTP code of the 2XX type thereto. In addition, the platform P creates in anticipation a communication context by recording in the MEM database the calling number of the request which is in this example the certified calling identity A, in association with the called number B and with the non-certified calling identity Abis.

During a step ETX6, the application of the terminal TA emits an outgoing communication, by sending to the V-MSC switch a "Call Control Setup" type message comprising the called number B and a technical identifier associated with the SIM/eSIM card of the terminal TA, this message being a message requesting the establishment of a communication.

During a step ETX7, the V-MSC switch receives the Call Control Setup type message, verifies based on the profile obtained in the VLR module that the outgoing communications are authorized, then triggers the intelligent network platform P since the trigger mark is present in said profile. The V-MSC switch sends to the platform P an IDP (Initial Detection Point) type message conforming to the CAMEL protocol and containing:

the certified calling identity A obtained from the profile (ETX3) downloaded from the HLR database during the phase of attachment of the calling terminal TA to the network;

the called number B obtained from the Call Control Setup type message; and the address of the platform P and the name of the service obtained from the VLR module.

The request to establish the outgoing communication remains pending at the V-MSC switch until the response from the platform P.

During a step ETX8, the CAMEL intelligent network platform P receives the IDP type message, detects the service logic to be applied from the name of the service contained in the IDP message, and consults the MEM database to search for the presence of a context associated with the calling identity A and the called number B.

As the result of the context search is positive, the platform P sends during a step ETX9 a command CX of the CAMEL CONNECT type to the V-MSC switch, this command CX comprising a "Generic Number" type parameter equal to the non-certified calling identity Abis, and the called number B.

During a step ETX10, the V-MSC switch receives the CAMEL CONNECT type command, translates the communication establishment request message into an IAM message (Initial Address Message) in accordance with the ISUP/BICC (ISDN Signalling User Part/Bearer-Independent Call Control) protocol. This IAM message contains:

the called number B in a "Called Number" field;

the certified calling identity A in a "Calling Party" field; and the non-certified calling identity Abis in a "Generic Number" field.

It is noted that the regulations in most countries, including France, require that the number that must be restored at a called terminal is the number contained in the "Generic Number" field and not in the "Calling Party" field. When the terminal TB associated with the called number B receives the communication, it restores, as calling number, the non-certified calling identity Abis contained in the "Generic Number" field.

Emission by the Terminal TA of a Communication by Using the Certified Identity a of this Terminal:

If the user of the terminal TA chooses during step ETX4 by using the application installed on the terminal, to emit a communication by using the certified calling identity A, the application does not implement step ETX5a and does not send a request. The platform P not finding a pre-context during step ETX8, responds to the V-MSC switch during step ETX9 with a CAMEL Continue type message. Thus, the V-MSC switch inserts during step ETX10 in the communication establishment request IAM message the certified calling identity A in the "Generic Number" and "Calling Number" fields and the called number B in the "Called Number" field.

Reception by the Terminal TA of a Communication Intended for its Non-Certified Identity Abis:

The network illustrated in FIG. 1 further includes EQ-Abis equipment from the network of the operator managing the non-certified identity Abis, equipment of the GMSC (Gateway Mobile Switch Center) type from the home network of the certified identity A of the terminal TA, and equipment managing an "Event API" type function connected to at least one BD-APP notification system owner of an operating system provider of the mobile terminals, such as the APNS (Apple Push Notification Service) and Firebase providers managing respectively the mobile operating systems Apple and Google (registered trademarks).

During a step ERX1, the terminal TB emits a message M1 requesting the establishment of a communication intended for the number Abis. The communication is routed according to the state of the art up to the network supporting this number Abis, particularly the EQ-Abis equipment. This EQ-Abis equipment can be a fixed SRS switch (Self-Routing Switch) if the called network is a STN network (Switched Telephone Network), or a TAS (Telephony Application Server) equipment, for example in Terminating mode, of an IMS/NGN (IP Multimedia Subsystem/Next Generation Network) core network if the called network is a VoIP (Voice over IP) fixed network, or a GMSC entry point if the called network is a mobile network. This EQ-Abis equipment is configured with an unconditional call forwarding of the communications emitted to the number Abis towards the number A of the terminal TA.

During a step ERX2, the EQ-Abis equipment sends to the GMSC device of the mobile network supporting the number A, a message requesting the establishment of a communication M2. The message M2 is obtained from the message M1 by modifying the called number Abis by the forwarding number A, by keeping the calling number B, by highlighting the field "redirection number" with the initially called number Abis, by positioning or incrementing a forwarding counter, and by adding information on the cause of the forwarding.

During a step ERX3, the GMSC equipment consults the HLR database of the home network by sending an SRI (Send Routing Information) type message containing the number A. The HLR database data managing this number returns the corresponding profile and particularly the CAMEL T-CSI (Terminating Camel Subscription Identifier) mark requesting to trigger the platform P.

During a step ERX4, the GMSC equipment sends to the platform P a CAMEL IDP type message containing the called number A, the calling number B, the forwarding number Abis present in the "Redirecting Number" field, and possibly an identifier of the service if the platform manages several services.

During a step ERX5, the platform P consults the MEM database by using the number A to verify that the service is authorized and active for this number A. The platform P detects that there is a forwarding number highlighted with the number Abis.

During a step ERX6, the platform P sends a notification message, for example of the HTTPS type, to the equipment managing the Event API function which transmits this notification message to the BD-APP system. This system sends to the application installed on the terminal TA, for example via the Internet network, a notification comprising the forwarding number Abis and the calling number B. Thus, the application is informed that it is going to receive a communication which will have to be associated with the non-certified identity Abis.

During a step ERX7, the platform P sends to the GMSC equipment a CAMEL Continue type message so that it continues the presentation of the communication towards the terminal TA in a standard way: only the calling number B is transmitted to the terminal TA.

During a step ERX8 and as known, the GMSC equipment queries the HLR database, via an SRI type message to obtain a routable technical number of the terminal TA for example according to the standard E.164, this number being assigned by the V-MSC switch to which the mobile terminal TA is connected under 2G or 3G coverage. The HLR database obtains this routable number from the V-MSC switch via a PRN (Provide Routable Number) type message and returns it to the GMSC equipment.

During a step ERX9, the GMSC equipment routes the communication to the V-MSC switch by providing it with a called number MSRN (Mobile Station Routable Number), the calling number B, but also the forwarding number Abis to notify the V-MSC switch that this communication is issued from a first call forwarding and should not be forwarded towards a number other than the messaging service of the called number A.

During a step ERX10, the V-MSC switch finds based on the called number MSRN the context of the mobile terminal TA and routes the communication towards the terminal TA by providing it only with the calling number B, for example via a CC-Setup type message. The application installed on the terminal TA finds the number B in the notification message of step ERX6 and then presents the communication according to the presentation parameters specific to the non-certified identity Abis, for example by generating a given ringtone or by displaying a given screen background or logo.

When the terminal TA is connected to the network in VoIP mode, for example when the cellular network is fourth or fifth generation (4G or 5G), exchanges similar to those described with reference to FIG. 1 occur to implement implements the service of emitting or receiving a communication by using a certified identity or a non-certified identity, but the exchanges are based on the SIP protocol (Session Initiation Protocol). As known, the home network of the terminal TA includes a database of the HSS (Home Subscriber Server) type in addition to the HLR base. As known, the 4G or 5G network includes equipment of the CSCF (Call State Control Function) type and equipment of the TAS (Telephony Application Server) type instead of the VMSC equipment used in the 2G or 3G networks.

These methods of alternate implementations for emitting or receiving communications by using a certified identity or an non-certified identity are not satisfactory, whether when the terminal TA is connected to the network in circuit mode (for example under 2G or 3G coverage) or in VoIP mode (for example under 4G or 5G or WiFi coverage). Indeed, the duration of the different exchanges between the network equipment affects the PDD delay (Post Dial Delay) necessary to establish the communication, which affects the user experience.

In addition, these methods are based on the CAMEL protocol, although this protocol is not supported by all the operators. In addition, this protocol is not supported by all the roaming agreements between the operators. In the absence of such an agreement, a terminal in a roaming situation cannot benefit from the service: if the user of the terminal selects to emit a communication by using the non-certified identity Abis, the emission of this communication cannot be admitted by the visited network, or the communication can be presented to the caller with the certified identity A.

In addition, the service according to the methods of alternative implementations can be provided by a given operator only for the terminals associated with certified calling identities assigned by this operator.

There is therefore a need for a solution that allows establishing a communication by using a certified or non-certified calling identity according to the choice of the user of a terminal, and which does not have the drawbacks of the methods of the state of the art.

SUMMARY

The disclosed technology relates to a method for establishing a communication between a first and a second terminal, the method being implemented by a server and comprising steps of:
  receiving, from the first terminal using a first calling identity, a request comprising information on a connection of the first terminal and an identifier of the first terminal;
  obtaining, from a database and by using the identifier, a pair of calling identities comprising one certified and one non-certified, the pair comprising said first calling identity and a second calling identity;
  determining, from one of said calling identities and from the information on the connection, a connectivity mode of the first terminal;

determining, depending on the connectivity mode, a routable number on which the first terminal can send a communication to the server, the server being configured to route the communication towards the second terminal by presenting a calling identity of said pair; and sending the routable number to the first terminal.

Correlatively, the disclosed technology relates to a server configured to establish a communication between a first and a second terminal, the server comprising:

communication means configured to receive, from the first terminal using a first calling identity, a request comprising information on a connection of the first terminal and an identifier of the first terminal;

a module for obtaining, from a database and by using the identifier, a pair of calling identities comprising one certified and one non-certified, the pair comprising said first calling identity and a second calling identity;

a module for determining, from one of said calling identities and from the information on the connection, a connectivity mode of the first terminal; and a module for determining, depending on the connectivity mode, a routable number on which the first terminal can send a communication to the server, the server being configured to route the communication towards the second terminal by presenting a calling identity of said pair;

the communication means being configured to send the routable number to the first terminal.

The characteristics and advantages of the proposed communication establishment method presented below apply in the same way to the proposed server and vice versa.

The proposed communication establishment method allows returning to the first terminal emitting the request, the routable number which allows the first terminal to reach the server and send the communication intended for the second terminal thereto, the server being configured to route this communication towards the second terminal.

The proposed server can be reached via one or several routable numbers. The routable number returned to the first terminal allows optimizing the routing of the communication from the first terminal towards the server, which allows reducing the cost of the communication and the energy consumption generated.

The proposed communication establishment server is a centralized server for providing the service. The proposed server can be located in any country, for example in the country of the home network of the terminal, in a country of a network visited by the terminal or in another country.

The proposed technique is not based on the CAMEL or INAP protocols. Thus, the communication establishment service by using a certified or non-certified calling identity can be ensured when the terminal is in a roaming situation, regardless of whether the roaming contract supports the CAMEL and/or INAP protocols or not. The proposed technique is nevertheless compatible with the use of the CAMEL and/or INAP protocols.

The proposed server can be managed by a telephone operator to provide the service to several terminals, without requiring that these terminals be associated with certified calling identities assigned by this operator. Alternatively, the proposed server can be managed by an OTT (Over The Top) type organization. Thus, any terminal can benefit from the service, regardless of its operator.

The routable number is preferably a fixed number. Alternatively, it can be a mobile number. The routable number can be in national or international E.164 telephone format or in TEL URI or SIP URI format.

Each of the certified and non-certified calling identities can be a fixed or mobile number.

Within the meaning of the disclosed technology, a certified calling identity, also called of the certified type, is an Installation Designation Number NDI.

Within the meaning of the disclosed technology, an non-certified calling identity, also called of the non-certified type, is an Additional Designation Number NDS.

A description of the NDI certified and NDS non-certified calling identities, in accordance with other implementations, is presented below to better understand the disclosed technology.

An NDI certified calling identity is certified by an entity managing the network of the calling device, for example the operator of the calling terminal.

In one embodiment in which the communication is a telephone call, this NDI identity may correspond to the telephone number associated with the actual telephone line of the calling terminal and is part of the international numbering plan E.164.

Several certified calling identities can identify the same communication. For example, in accordance with the SIP protocol (Session Initiation Protocol, standard IETF RFC 3261), an outgoing call from a company can be identified by a PAI (Private Asserted Identity and defined in the IETF RFC3325 standard) field to a SIP URI format containing the number of the calling telephone set (in a "user" part conforming to the SIP URI format) and another PAI field to a TEL URI format corresponding to the telephone number of the company standard, the two PAI fields being included in a call presentation SIP INVITE message.

A call presentation SIP INVITE message may contain two PAI fields with two different formats, but which may or may not contain the same information, for example the same telephone number contained in a PAI field in TEL URI format and in the user part of a PAI field in SIP URI format.

In accordance with an alternative implementation, a NDS non-certified calling identity is transported transparently from end to end from the calling terminal up to the called terminal without any control from a calling operator or a called operator or a transit operator, this NDS non-certified calling identity being inserted by the installation of the calling terminal.

In accordance with the SIP protocol, an NDS non-certified calling identity may be included in a SIP FROM field in a SIP INVITE message. According to the state of the art, the SIP INVITE message includes only one SIP FROM field.

A non-certified calling identity can be a masked identity.

A non-certified calling identity may be an unavailable identity. For example, a call identified by an unavailable non-certified calling identity, in other words a call without a non-certified calling identity, can be presented by a SIP INVITE message comprising an empty SIP FROM field, for example a FROM: "Unavailable" field sip:unavailable@ unknown.invalid. Typically, when the signaling of the communication identified by this non-certified calling identity uses a network that does not support the type of non-certified calling identities, for example an old generation network, the non-certified calling identity is deleted.

In France, it is the NDS non-certified calling identity that is displayed on the called device. For example, when a call center emits communications for a commercial campaign at the request of a company, the call center does not present the call center number, but presents the company number as a NDS non-certified calling identity so that the called device can call back the company and not the call center.

In other countries, the NDI certified calling identity that is displayed on the called device.

In one particular embodiment, the request comprises a called number, the proposed method further comprises:
- a step of recording in a memory, for a given duration, the called number in association with said pair (that is to say with the first calling identity and the second calling identity); and
- after receiving a communication emitted with the first calling identity, a step of obtaining the called number and the second calling identity from the memory; and
- a step of routing the communication towards the called number by presenting, according to a criterion selected by a user of the first terminal, the first or the second calling identity of said pair.

In one particular embodiment, the connectivity mode of the first terminal corresponds to a connectivity of the first terminal to its home network or to a visited network and/or to a connectivity in circuit technology or in VoIP technology.

The proposed technique allows taking into account the situation of the first terminal, under coverage of its home network or under coverage of a visited network, i.e. in a roaming situation, and the technology of the connection of the first terminal to the home or visited network: in circuit mode or in VoIP mode. It is recalled that a connection in VoIP technology can be for example a connection in VoLTE, VoNR or VoWiFi (Voice over Long Term Evolution, Voice over New Radio, and Voice over Wireless Fidelity) technology. Taking these elements into account allows determining, if the server can be reached via several routable numbers, the routable number which optimizes the communication routing from the first terminal towards the proposed server, for example in terms of technological compatibility, optimization of the voice quality of the communications, communication delay and/or cost.

In one particular embodiment, the determined connectivity mode represents a connectivity of the first terminal to its home network, the routable number being a number assigned in the same geographic charging zone as that of the home network, such as a number of the same country as that of the home network.

In one particular embodiment, the determined connectivity mode represents a connectivity of the first terminal to a visited network in circuit technology, the routable number being a number assigned in the same geographical charging zone as that of the visited network, for example in the same country as that of the visited network or in the same geographical zone as that of the visited network in which the roaming costs are imposed and identical regardless of the country of this zone, such as the Europe zone.

This routable number assigned in the same zone as that of the visited network allows reducing the PDD delay and avoiding communication costs in a roaming situation. Indeed, in this mode, the terminal uses a V-MSC switch of the operator of the visited country, which downloads into its VLR module the profile associated with the certified calling identity of the terminal, from the HLR database of the home operator. It is recalled that the roaming model corresponding to the connectivity in circuit mode is of the LBO (Local Break Out) type.

In one particular embodiment, the determined connectivity mode represents a connectivity of the first terminal to a visited network in VoIP technology according to an LBO type roaming model and under an agreement of roaming in VoIP between the operators of the home and visited networks, the routable number being a number assigned in the same geographical charging zone as that of the visited network, for example in the same country.

Even if the signaling of the communication according to the SIP protocol makes a round trip between the visited country and the home country then between the home country and the visited country, the media streams according to the RTP protocol (Real Time Protocol) remain located at the visited country, more specifically between the first terminal, an IM-GW (IP Multimedia Gateway) type equipment controlled by a P-CSCF type equipment of the visited country (Proxy Call State Control Function) and interconnection equipment with the proposed server. It is recalled that the media streams according to the RTP protocol are expensive at the international interconnection networks of the IPX (International Packet Exchange) type. The routable number assigned in the country of the visited network avoids these costs. In addition, keeping these media streams in the visited country allows avoiding an RTD delay (Round Trip Delay) in the routing of these streams between the country of the home network and that of the visited network.

In one particular embodiment, the determined connectivity mode represents a connectivity of the first terminal to a visited network in VoIP technology according to an S8HR type roaming model and under an agreement of roaming in VoIP between the operators of the home and visited networks, the routable number being a number assigned in the same geographical charging zone as that of the home network, for example in the same country as that of the home network.

It is recalled that the S8HR (S8 Home Routed) model is a standardized roaming model according to 3GPP and GSMA standards. In this case, the communications of the first terminal pass through an eNodeB or gNode base station of the visited operator and an SGW (Serving Gateway) switch of the visited operator. However, these communications pass through a PGW (Packet network Gateway) router and equipment from the IMS core network of the home operator: equipment of the P-CSCF, I-CSCF, S-CSCF and TAS type. The RTP media stream, according to the S8HR roaming model, emitted or received by the mobile terminal transits through an IPX interconnection network between the first terminal, an SGW equipment of the visited operator, a PGW equipment of the home operator and an IM-GW equipment of the home operator controlled by the P-CSCF equipment of the home operator. In this embodiment, the routable number which reduces the PDD delay and the communication cost is a number assigned in the same geographical charging zone of the home network, for example in the country of the home network.

The proposed technique allows providing the service for the emitted communications but also for the communications received by a terminal, on a certified or non-certified identity of this terminal.

In one particular embodiment, the communication establishment method comprises steps of:
- after receiving a communication intended for the non-certified identity of the first terminal, searching in the database for this non-certified identity, and in case of positive search:
- obtaining the certified identity associated in the database with the non-certified identity;
- sending to the certified identity a notification alerting of a future communication emitted to the non-certified identity, the notification comprising the calling number of the communication; and
- routing the communication towards the certified identity.

This embodiment relates to the communications emitted to the non-certified identity of the first terminal and forwarded by the proposed server towards the certified identity of the first terminal.

In one particular embodiment relating to a communication emitted to the non-certified identity, the communication establishment method further comprises a step of selecting interconnection equipment in the country in which the certified identity is assigned, this equipment being selected from a routing table and/or an portability base of the NPS (Number Portability Server) type, the communication emitted to the non-certified identity being routed via the interconnection equipment.

The selected equipment allows reducing communication latency and cost.

The disclosed technology also relates to a device comprising a module configured to record in a memory at least one identifier associated with a pair of calling identities of a terminal, comprising one certified and one non-certified.

Particularly, the proposed device can be part of the proposed server.

The disclosed technology also relates to a communication method implemented by a terminal and comprising steps of:
- sending to a server a request comprising information on a connection of the terminal and an identifier of the terminal;
- receiving from the server a routable number on which the terminal can send a communication to the server, the server being configured to route the communication towards a second terminal by presenting a calling identity from among a pair of calling identities associated with said identifier, the pair comprising a certified calling identity and an non-certified identity of the terminal; and
- sending a communication to the routable number.

Correlatively, the disclosed technology relates to a terminal comprising communication means configured to:
- send to a server a request comprising information on a connection of the terminal and an identifier of the terminal;
- receive from the server a routable number on which the terminal can send a communication to the server, the server being configured to route the communication towards a second terminal by presenting a calling identity of a pair associated with said identifier, the pair comprising an certified calling identity and a non-certified calling identity of said terminal; and
- send a communication to the routable number.

The characteristics and advantages of the proposed communication method presented below apply in the same manner to the proposed terminal and vice versa.

The characteristics and advantages of the proposed communication establishment method (and of the server) apply in the same manner to the proposed communication method (and to the terminal) and vice versa.

The terminal can be of the mobile telephone type, for example a Smartphone, or a tablet, or a computer or any other type of communicating device.

In one particular embodiment, the proposed communication method further comprises steps of:
- receiving a notification alerting of a future communication on a number, the notification comprising the calling number of said communication;
- selecting, for the calling number and for a given duration, communication presentation parameters; and
- after receiving a communication whose calling number is the calling number contained in the notification, presenting the communication according to the selected parameters.

This embodiment allows restoring a communication received on the certified identity in a different manner from a communication received on the non-certified identity.

The disclosed technology has an advantageous application for people in telework situation or on business trips.

The disclosed technology also relates to a computer program on a recording medium, this program being capable of being implemented in a computer or in the proposed server. This program includes instructions adapted to the implementation of a communication establishment method as described above, when the program is executed by a computer.

The disclosed technology also relates to a computer program on a recording medium, this program being capable of being implemented in a computer or in the proposed terminal. This program comprises instructions adapted to the implementation of a communication method as described above, when the program is executed by a computer.

Each of these programs may use any programming language, and be in the form of source code, object code, or intermediate code between source code and object code, such as in partially compiled form, or in any other desirable form.

The disclosed technology also relates to an information medium or a recording medium readable by a computer, and comprising instructions of a computer program as mentioned above.

The information or recording medium can be any entity or device capable of storing the program. For example, the medium can include a storage means, such as a ROM, for example a CD ROM or a microelectronic circuit ROM, or a magnetic recording means, for example a hard disk, or a flash memory.

On the other hand, the information or recording medium can be a transmissible medium such as an electrical or optical signal, which can be routed via an electrical or optical cable, by radio link, by wireless optical link or by other means.

The programs according to the disclosed technology can be particularly downloaded from an Internet type network.

Alternatively, the information or recording medium can be an integrated circuit in which one of the programs is incorporated, the circuit being adapted to execute or to be used in the execution of a method in accordance with the disclosed technology.

BRIEF DESCRIPTION OF THE DRAWINGS

Other characteristics and advantages of the disclosed technology will become apparent from the description given below, with reference to the appended drawings which illustrate an exemplary embodiment without any limitation.

FIG. 3 and FIG. 3bis are a flowchart representing steps of a communication establishment method and steps of a communication method implemented according to the first particular embodiment.

DETAILED DESCRIPTION

Figure 1:
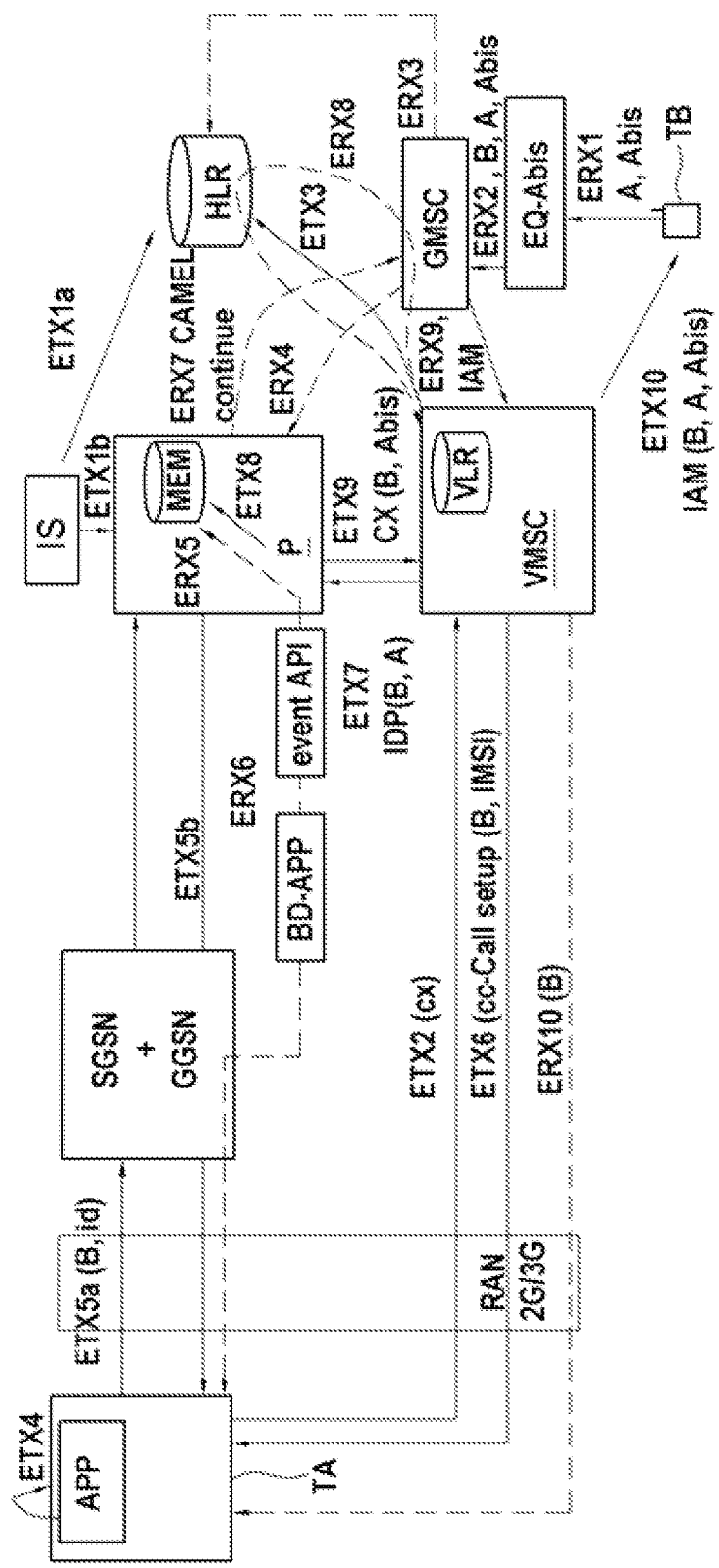
FIG. 1, described above, illustrates an architecture of a communication network in which a method of the state of the art is implemented to establish a communication.
Figure 2:
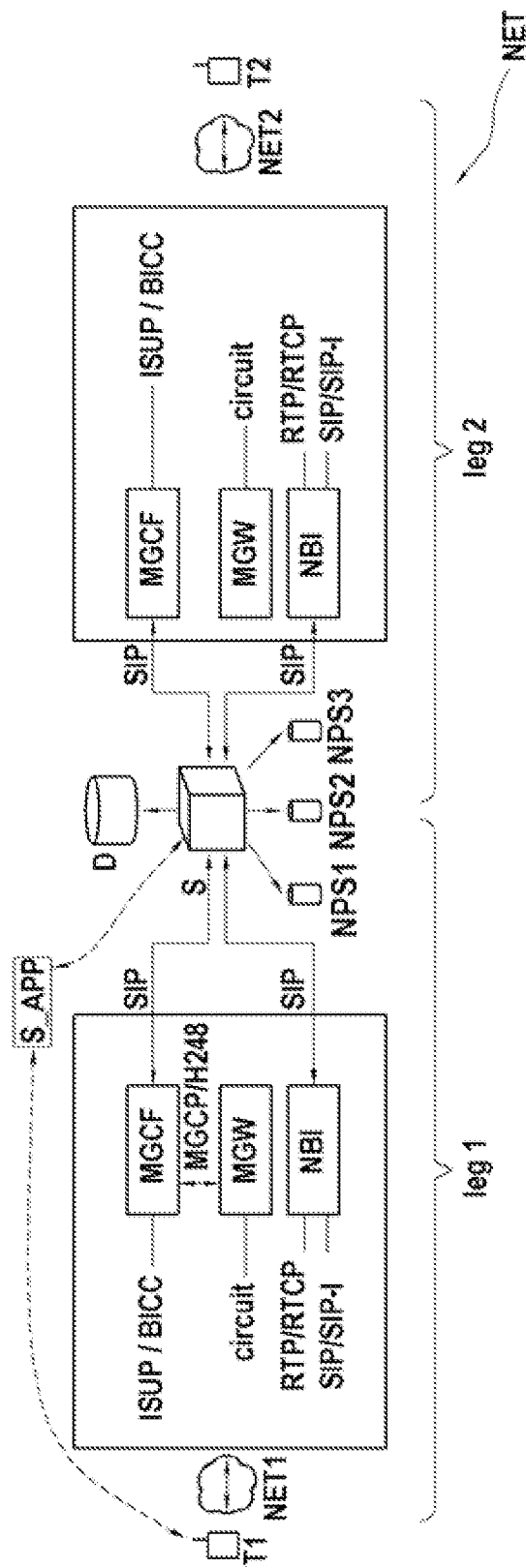
FIG. 2 is an architecture of a communication network in which proposed methods are implemented according to a first particular embodiment.

FIG. 2 is an architecture of a communication network in which a communication establishment method and a communication method are implemented according to one particular embodiment.

In the embodiment described here, the network NET is an Internet type network connecting cellular communication networks NET1 and NET2, for example of the 2G, 3G, 4G, 5G or later generation type. However, these networks NET1 and NET2 can be of another technology, for example of the WiFi type or an optical network.

The communication network NET1 includes at least one terminal T1 in accordance with the disclosed technology, such as a mobile telephone, a tablet or a computer. A software application APP is installed on the terminal T1 to benefit from a communication service by using a certified calling identity A of the terminal T1, or a non-certified calling identity Abis of the terminal T1. A terminal T2 associated with a calling identity B is connected to the network NET2.

The network NET includes a communication establishment server S, the server S being in accordance with the disclosed technology. The server S can be managed by a telephone operator or by an organization of the OTT type. The server S constitutes a centralized platform providing the communication service by using a certified or non-certified identity.

The network NET includes at least one notification platform S_APP managed by a provider of an operating system of the terminal T1, for example Apple or Google (registered trademarks). The platform S_APP is configured to notify the application APP installed on the terminal T1 when an incoming communication has been emitted to the non-certified identity Abis.

In the mode described here, the terminal T1 communicates with the terminal T2 by implementing the communication service by using the certified identity A or the non-certified identity Abis. A communication between the terminals T1 and T2 passes via the server S. The part of the communication between the terminal T1 and the server S is denoted by "leg1" and the part of the communication between the server S and the terminal T2 is denoted by "leg2".

The network NET also includes a device D in accordance with the disclosed technology. This device D comprises a module configured to record in a memory at least one identifier ID associated with a pair of calling identities (A, Abis) of a terminal (T1 for example), comprising one certified (A) and one non-certified (Abis). The information recorded in the memory can be recorded as a database.

The server S communicates with the device D. Particularly, the device D can be integral with the server S.

The server S includes a SIP server in B2BUA (Back To Back User Agent) mode that allows managing two parts of a communication according to the SIP protocol, such as the parts leg1 and leg2.

The server S further includes a client of the DNS ENUM (Domain Name System Electronic NUMbering) type which can consult number portability databases, for example of the NPS type, of different countries.

The server S further includes an HTTPS Web client for sending notifications towards notification platforms, such as the platform S_APP.

Each of the two parts leg1 and leg2 can be either in circuit technology or in VoIP technology.

In the case of the circuit technology, the communication signaling is in ISUP or BICC protocol. Communication media streams transit via 64 kbit/s circuits if the signaling protocol is ISUP, or in IP transport via the RTP protocol if the signaling protocol is BICC.

In the case of VoIP technology, the signaling of the communication is in the SIP or SIP-I protocol (SIP ISUP). Communication media streams transit in IP transport via the RTP protocol.

Different fixed or mobile routable telephone numbers are assigned to the server S in several countries. These routable numbers represent service access numbers. These numbers are denoted by TSAN (Technical Service Access Number).

The advantage of using several TSANs is to be able to optimally manage the service quality, in particular in terms of delay of establishment of a communication and voice quality of the communications (for example by limiting the use of audio transcoders on international communication channels, which allows limiting the flow rate necessary for the communication media streams), and the costs of interconnection of the two parts leg1 and leg2.

Figure 3:
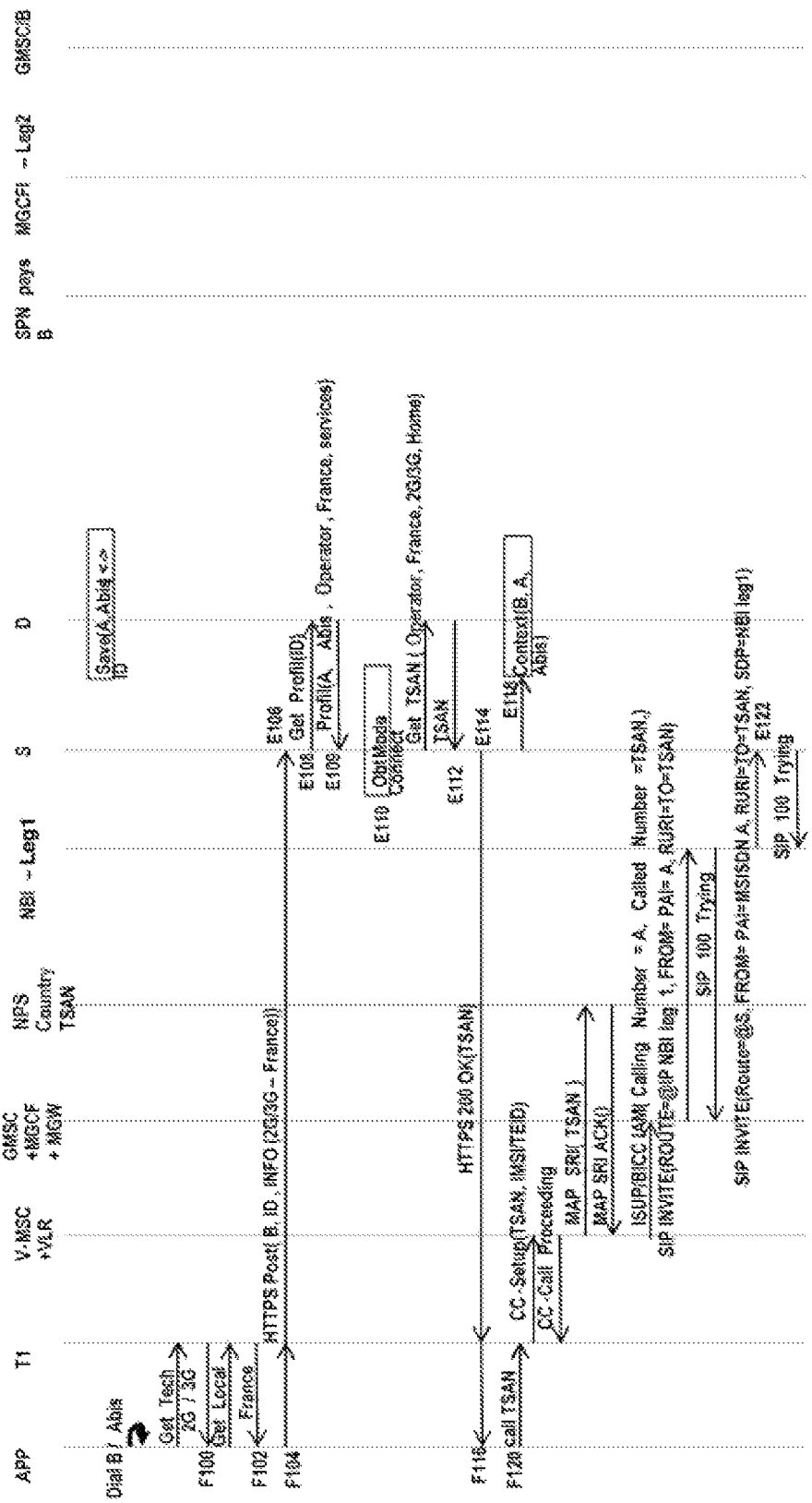

FIG. 3 and FIG. 3bis are a flowchart representing steps of a communication establishment method (referenced Exxx) and steps of a communication method (referenced Fyyy), implemented according to a first particular embodiment, respectively by the server S and the terminal T1 described with reference to FIG. 2.

In the embodiment described here, the network NET1 is the home network of the terminal T1. The networks NET1 and NET2 are in different countries and are managed by two different operators. It is assumed for example that the terminal T1 is in France and that the terminal T2 is in England.

It is assumed that the terminal T1 has already subscribed to the communication service with the server S by using a certified identity or an non-certified identity.

During the service subscription phase, the terminal T1 provides to the server S its certified calling identity A and at least one non-certified calling identity Abis.

The terminal T1 can also provide to the server S:
  the name of the operator who assigned the certified calling identity A, and implicitly the country in which this identity A is assigned;
  a list of authorized or unauthorized services, for example a prohibition to emit communications towards surcharged numbers of the Audiotel type, a prohibition to emit communications towards some prefixes or international numbers, a limitation of a maximum duration of a call, and/or an authorization or a prohibition of a double call service; and or an IMEI (International Mobile Equipment Identity) identifier of the terminal T1, to improve the security of the service.

After receiving this information, and during the service subscription phase, the server S assigns and sends to the terminal T1 a technical identifier ID associated with the pair of the identities A and Abis. The application APP installed on the terminal T1 associates a communication presentation environment with this identifier ID or with the non-certified identity Abis.

In case where several non-certified calling identities are associated with the terminal T1, the server S assigns to it as many technical identifiers. The application APP associates a communication presentation environment for each technical identifier.

It is assumed that the user of the terminal T1 triggers the application APP and dials the number B associated with the terminal T2. The user wishes to emit a communication by presenting the non-certified calling identity Abis to the terminal B.

During a step F100 of the communication method, the application APP obtains via the different application interfaces API provided by the operating system of the terminal T1 information on the connection technology of the terminal T1 to the network NET1. In this example it is assumed it is a circuit mode connectivity, the network NET1 being a $2^{nd}$ or $3^{rd}$ generation cellular network.

During a step F102, the terminal T1 and more specifically the application APP obtains information on the current location of the terminal T1. This information can be obtained from a GPS (Global Positioning System), or from an MCC code (Mobile Country Code) of the access network comprised in an identifier of the 2G or 3G radio cell.

During a step F104, the terminal T1 and more specifically the application APP sends to the server S a request, for example of the HTTPS POST type, comprising the technical identifier ID, the called number B, and information INFO on the connection of the terminal T1 to the network NET1. The information INFO includes an indication that the connectivity technology is in circuit mode and that the terminal T1 is located in France. An address of the server S is preconfigured in the application APP.

During a step E106 of the communication establishment method, the server S receives the request.

During a step E108, the server S queries the device D by providing as input the technical identifier ID.

The device D returns to the server S, during a step E109, a pair comprising the certified calling identity A and the non-certified calling identity Abis, the name of the operator of the home network and the country of this operator (France), and possibly the list of the authorized or unauthorized services for the terminal T1.

During a step E110, the server S determines from the certified calling identity A and from the information INFO, a connectivity mode of the terminal T1. In this example, the connectivity mode corresponds to a connectivity to the home network according to the circuit technology.

During a step E112, the server S determines, depending on the connectivity mode, a routable number TSAN on which the terminal T1 can send a communication to the server S. The routable number TSAN allows optimizing the routing of the communication between the calling terminal T1 and the centralized server S.

Figure 4:
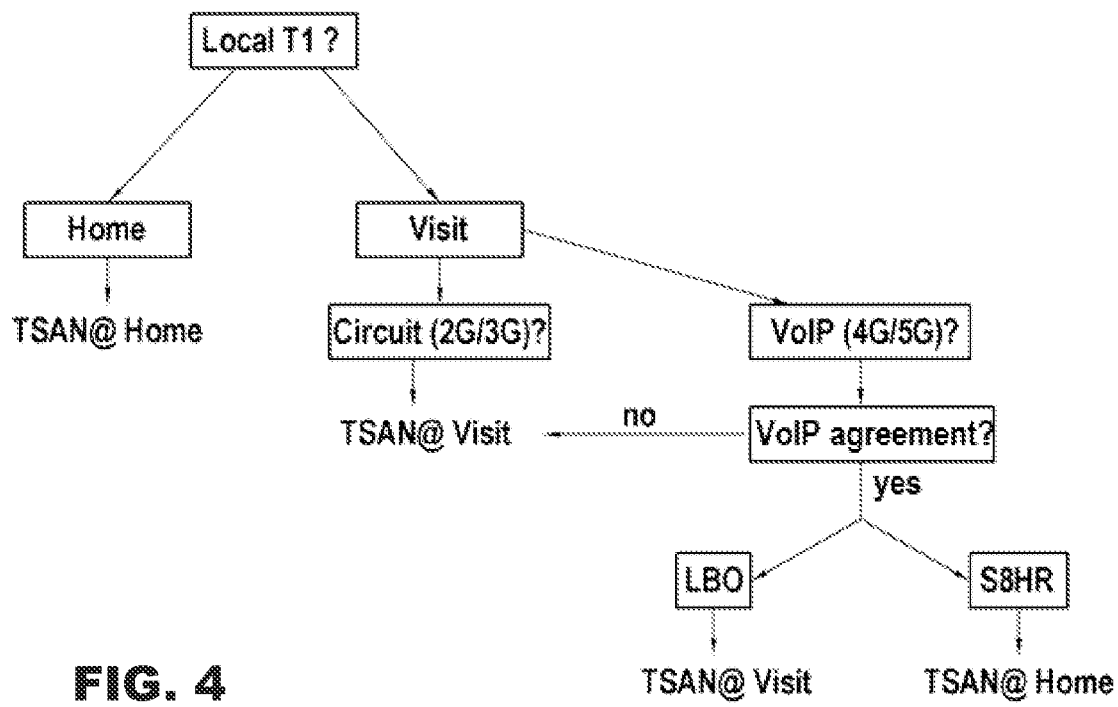
FIG. 4 is a flowchart representing a step of determining a routable number, according to a communication establishment method implemented according to the first particular embodiment.

FIG. 4 is a flowchart representing the step E112 of determining a routable number TSAN:
if the terminal T1 is connected to its home network, the TSAN is a routable number assigned in the same geographic charging zone as that of the home network, for example in the country of the home network;
if the terminal T1 is connected to a visited network (in a roaming situation) in circuit technology, the TSAN is a routable number assigned in the same geographical charging zone as that of the visited network, for example in the country of the visited network;
if the terminal T1 is connected to a visited network (in a roaming situation) in VoIP technology, in the absence of a roaming agreement supporting the VoIP technology between the operators of the home and visited networks, the TSAN is a routable number assigned in the same geographical charging zone as that of the visited network, for example in the country of the visited network (since in this case the visited network requires from the terminal to activate the Circuit Switch Fallback mode which uses a 2G or 3G type connectivity during the communication);
if the terminal T1 is connected to a visited network (in a roaming situation) in VoIP technology according to an LBO type roaming model and under an agreement of roaming in VoIP between the operators of the home and visited networks, the TSAN is a routable number assigned in the same geographical charging zone as that of the visited network, for example in the country of the visited network; and
if the terminal T1 is connected to a visited network (in a roaming situation) in VoIP technology according to an S8HR type roaming model and under an agreement of roaming in VoIP between the operators of the home and visited networks, the TSAN is a routable number assigned in the same geographic charging zone as that of the home network, for example in the country of the home network.

In the example described with reference to FIGS. 3 and 3bis, the connectivity mode corresponds to a connectivity to the home network according to the circuit technology, the determined number TSAN (E112) is therefore a routable number assigned in the same geographical charging zone of the home network, for example in the country of the home network (France). Particularly, this number TSAN can be selected (E112) depending on the operator of the home network. The server S can obtain the number TSAN from a database hosted by the device D.

During a step E114, the server S sends the number TSAN to the terminal T1, for example via an HTTPS 200 OK type code.

The terminal T1 receives the number TSAN during a step F116.

During a step E118, the server S records in a memory, for a given duration, a context of a future communication, this context comprising the certified calling identity A (used as the calling identity of the request), the non-certified calling identity Abis and the called number B.

This recording step E118 is implemented after step E106 of receiving the request. The recording step E118 can be implemented before, after or simultaneously with one of the steps E108, E110, E112 or E114.

During a step F120 of the communication method, the terminal T1 and more specifically the application APP emits a communication to the number TSAN.

As known, the terminal T1 sends a CC_Setup type message from the Call Control (CC) domain to the V-MSC switch to which the calling terminal T1 is connected. This message contains the called number TSAN and a TEID or IMSI (Temporary Equipment identifier and International Mobile Subscription Identity) identifier of the terminal T1.

The V-MSC switch finds, based on the TEID or IMSI identifier, a telephone service profile downloaded into a VLR module of the V-MSC switch, from an HLR database of the home network during the initial connection of the terminal T1. Particularly, the certified calling identity A is found in this profile. As the called number TSAN is a number assigned in the same country as that of the home network, the V-MSC switch consults an NPS type portability server by providing the called number TSAN as input key so as to determine the operator supporting this number TSAN and the communication technology used by a network entry point supporting the number TSAN. Assuming in this example that the technology of the entry point is VoIP, the V-MSC switch sends an ISUP/BICC IAM type message to a GMSC equipment which integrates an MGCF function (Media Gateway Control Function). This message contains the certified calling identity A in the "Calling Number" and "Generic Number" fields, and the number TSAN in the "Called Number" field. As known, when the GMSC equipment receives this message, it determines that it must transmit the signaling downstream according to the SIP or possibly SIP-I protocol. The MGCF function constitutes a signaling gateway between the ISUP/BICC protocols on the one hand and the SIP/SIP-I protocols on the other hand. The MGCF function controls an MGW (Media Gateway) function whose role is to transform a communication in 64 kbit/s circuit mode into media RTP-RTCP protocol (Real-Time Transport Control Protocol) or an RTP-RTCP relay in BICC protocol.

As known, the MGCF function generates a SIP or SIP-I INVITE type signaling message and routes it, for example, tords an NBI (Network Border Infrastructure) equipment, entry point of the network supporting the called number TSAN, which itself routes it towards the server S. The NBI equipment and the server S can be interconnected by an Internet-type network or can be collocated.

During a step E122, the server S and more specifically its B2BUA function receives the SIP INVITE message.

Thus, the first part of the communication leg1 is established.

After receiving (E122) the SIP INVITE message emitted with the calling identity A, the server S obtains this certified identity A, for example from the PAI field preferably or from the ROM field of the SIP INVITE message. During a step E124, the server S searches, at least based on the certified calling identity A, the communication context previously saved during the step E118 and thus finds that the number B has been associated in the memory with the certified calling identity A. The server S, and particularly its B2BUA server obtains from the memory the called number B and the non-certified calling identity Abis.

During a step E126, the server S and particularly its B2BUA server determines the best interconnection equipment to be used for reaching the called number B. Having the international prefix of the called number B (in this example the prefix +44 for England), the server S determines that the called number B is assigned in England. During step E126, the B2BUA server consults, for example via the DNS ENUM protocol, the NPS portability base of the called country (England in our example), and thus obtains the operator supporting this number B as well as the technology of the entry point of this operator.

It is assumed in this example that the entry point of this operator is in circuit technology. Consequently, the B2BUA server selects for the part leg 2, an MGCF equipment of the operator supporting the called party B of the destination country (England) which itself controls an MGW function.

During a step E128, the server S and particularly its B2BUA server routes the SIP INVITE message towards the number B by modifying the calling identity information according to the display rules of the calling number of the country of the called party:

by inserting the non-certified calling identity Abis in the "FROM" field and the certified calling identity A in the PAI field, if it is the non-certified calling identity FROM that must be displayed on the called terminal T2 according to the regulations in England; where by inserting the certified A or non-certified Abis calling identity in the "FROM" field and the non-certified calling identity Abis in at least one PAI field, if it is the certified PAI calling identity that must be displayed on the called terminal T2 according to the regulations in England.

As known, the MGCF equipment transforms the SIP message into ISUP/BICC protocol and controls an MGW function. The communication is routed up to the GMSC equipment of the called operator and the latter routes the communication towards the called terminal T2 according to its location (home or visited network) and according to the type of its access network used by the terminal T2 (for example 2G/3G or 4G/5G cellular network or WiFi).

In one particular embodiment, if during step E124, the server S does not find the communication context, for example because it has been erased from the memory after a certain delay, the server S and particularly its B2BUA server can send to the terminal T1 a 4XX or 5XX or 6XX type error code, which results after transformation into ISUP, ISUP/BICC and/or Call Control protocol in an error tone on the calling terminal T1.

Alternatively, the B2BUA server of the server S can control a voice server configured to emit a voice message indicating the problem to the caller and/or proposing him to continue the outgoing communication by using the certified identity A as the calling number rather than the non-certified calling identity Abis.

Alternatively, the B2BUA server of the server S can be configured in this case to implicitly continue the outgoing communication by using the certified identity A as the calling number rather than the non-certified calling identity Abis.

In one embodiment where the consultation of an NPS base is not possible or not authorized for the server S, the server S and particularly its B2BUA server uses during step E126 a routing table to determine the best interconnection equipment to be used to reach the called number B.

The examples described above consider the assumption that the user of the terminal T1 selects to emit the outgoing communication by using the non-certified identity Abis as the calling number. Alternatively, the user can choose to emit the outgoing communication by using the certified identity A as the calling number. In this case, the communication is processed as known without transiting through the server S.

According to another example of implementation of the embodiment described with reference to FIGS. 2 to 4, the network NET1 is a visited network of the terminal T1, in other words T1 is in a roaming situation. The network NET1 is in circuit technology. Steps identical to those described with reference to FIGS. 3 and 3bis are implemented, except that the number TSAN determined during step E112 is a number assigned in the country or the geographical zone of the visited network.

Figure 5:
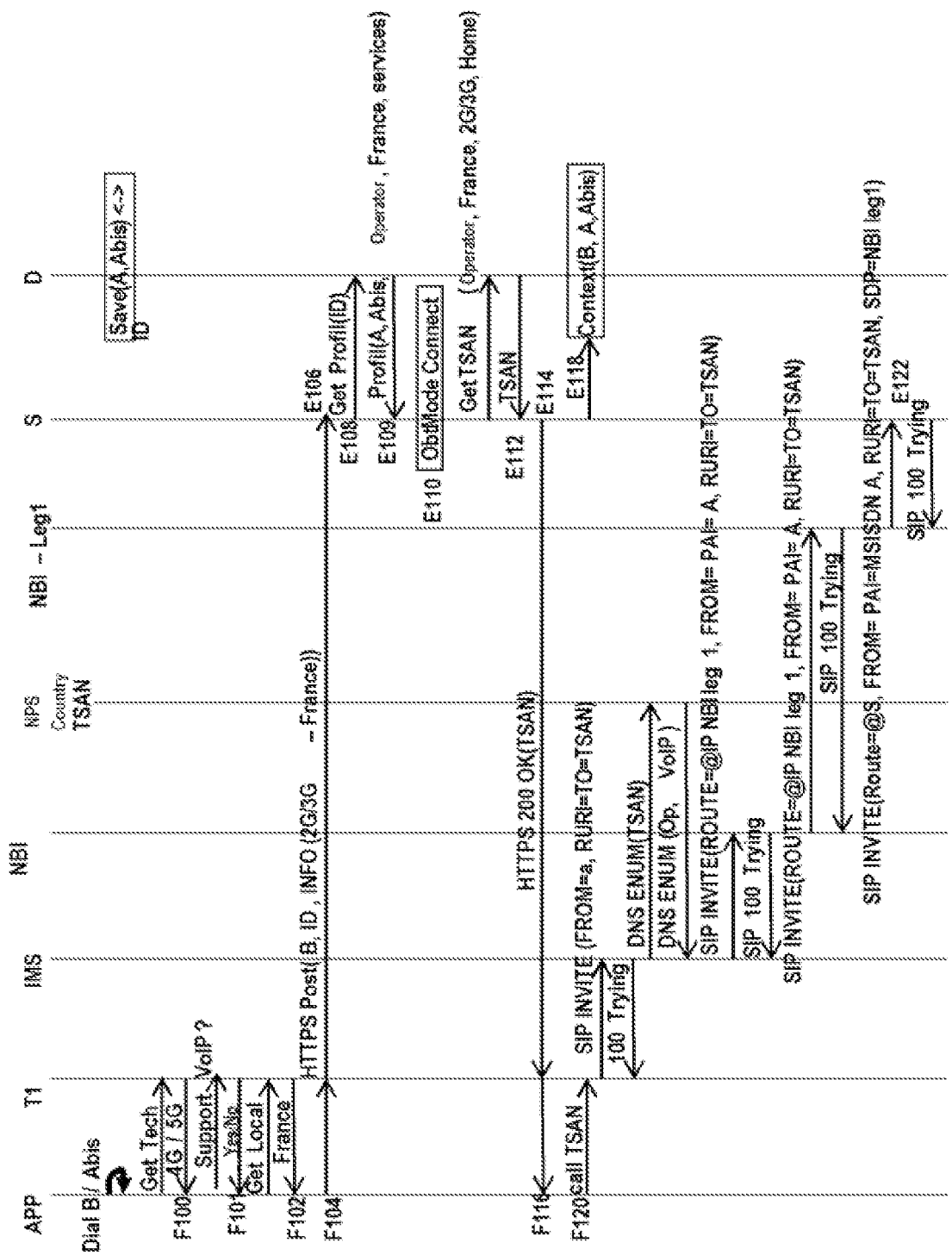
FIG. 5 is a flowchart representing steps of a communication establishment method and steps of a communication method implemented according to one variant of the first particular embodiment.

FIG. 5 is a flowchart representing the steps of a communication establishment method (referenced Exxx) and the steps of a communication method (referenced Fyyy), implemented according to one variant of the embodiment described with reference to FIGS. 2, 3 and 4.

In the example illustrated in FIG. 5, the network NET1 is the home network of the terminal T1. Unlike the example in FIGS. 3 and 3bis, the network NET1 is a 4$^{th}$ or 5$^{th}$ generation cellular network, in VoIP technology.

In addition to obtaining the access technology (F100) and information on the location of the terminal T1 (F102), the application APP obtains during a step F101, via application interfaces of the terminal T1, information to determine whether the terminal T1 supports the VoIP technology or not.

If the terminal T1 does not support the VoIP technology, it will switch to circuit mode (2G or 3G), for example to CS Fallback mode, and steps identical to those described with reference to FIGS. 3 and 3bis are implemented.

If the terminal T1 supports the VoIP technology, steps similar to those described with reference to FIGS. 3 and 3bis are implemented, but the exchanges in the network NET1 comply with the SIP or SIP-I protocol as described in FIG. 5.

According to another exemplary implementation, the network NET1 is a WiFi network. If the terminal T1 supports the VoWiFi technology, steps identical to those described with reference to FIG. 5 are implemented.

According to another exemplary implementation, the network NET1 is a visited network for the terminal T1, in other words the terminal T1 is in a roaming situation. If the application APP determines during step F100 that the network NET1 access technology is in VoIP, the application APP obtains during a step F101 (similar to step F101 described with reference to FIG. 5), via application interfaces of the terminal T1, information to determine whether the terminal T1 supports the VoIP technology or not, but also whether a roaming agreement between the operator of the home network of the terminal T1 and that of the visited network NET1 supports the VoIP technology. In the absence of the support of the VoIP technology by the roaming agreement, the terminal T1 will switch to circuit mode (2G or 3G), for example to CS Fallback mode, and steps identical to those described with reference to FIGS. 3 and 3bis are implemented. If the VoIP technology is supported by the roaming agreement, the application searches for the address of the entry point of the IMS network (for example the P-CSCF equipment) obtained from the mobile core network, more specifically from an MME (Mobility Management Entity) equipment if the network NET1 is a 4G cellular network, or from an AMF (Access and Mobility Management Function) equipment if the network NET1 is a 5G cellular network. It is recalled that the format of the address of the P-CSCF entry point of the IMS network is standardized by 3GPP and is of the type: mnc.mcc.ims.network.3gpp.org, mnc being a code of the operator and mcc a code of the country of the operator managing the P-CSCF equipment. The terminal T1 sends (F104) all or part of the address of the entry point in the HTTPS request to the server S so that it can determine the roaming model: S8HR or LBO, and thus determine the number TSAN to be returned according to the flowchart in FIG. 4. If the country code of the entry point of the IMS network is identical to the country code of the home operator supporting the terminal T1 and declared in the device D, and if the terminal T1 is located in a visited country, then it is determined that the VoIP roaming model S8HR is implemented. If the country code of the IMS network entry point is different from the country code of the home operator supporting the terminal T1 and declared in the device D, and if the terminal T1 is located in a visited country, then it is determined that the VoIP roaming model LBO is implemented.

Figure 6:
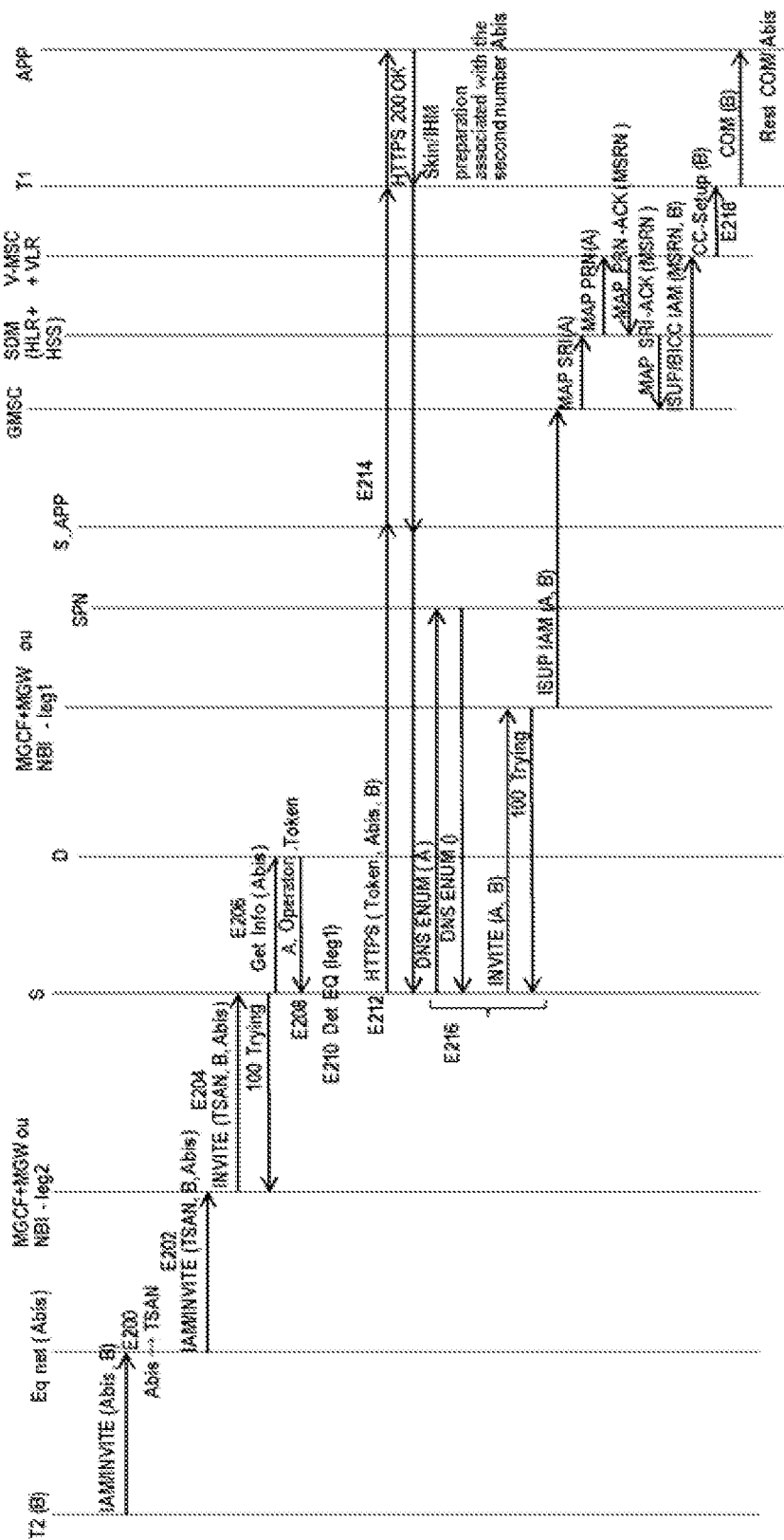
FIG. 6 is a flowchart representing steps of a communication establishment method implemented according to a second particular embodiment.

FIG. 6 is a flowchart representing steps of a communication establishment method (referenced Exxx) implemented according to a second particular embodiment by the server S described with reference to FIG. 2.

In this second embodiment, the terminal T2 emits a communication to the non-certified identity Abis which is associated with the terminal T1.

It is assumed that the network NET1 is in circuit technology and represents the home network or a visited network for the terminal T1.

The calling terminal T2, having the number B, dials the number Abis.

The communication is routed in a conventional manner up to the equipment supporting the services of the number Abis, such as a telephone application server TAS in the case of a VoIP network or SRS type equipment in the case of an STN network or GMSC equipment in the case of a mobile network. This equipment receives the communication during a step E200. This equipment is configured for the number Abis with a forwarding call, for example an unconditional forwarding, towards a routable number TSAN for accessing the service for the incoming communications vis-à-vis the terminal T1. The forwarding can be configured via a telephone line associated with the number Abis, or via the application APP installed on the T1 terminal if such forwarding is authorized, or via a selfcare web service.

The optimum number TSAN is selected according to the country in which the number Abis is assigned, to the operator assigning the number Abis, to the type of this fixed or mobile number, and to the technology of the entry point of the operator (circuit or VoIP). The telephone equipment supporting the number Abis can have this information from a portability server, for example of the NPS type, based on the number Abis.

The TAS or SRS or GMSC equipment supporting the number Abis transmits during a step E202 the communication towards the number TSAN by modifying the called number in the signaling message with the number TSAN instead of the number Abis, by adding in this signaling message and more specifically in a redirection field the identity of the initial called party, i.e. the number Abis, by specifying the cause of the forwarding, for example an unconditional forwarding, and by setting or incrementing a forwarding counter.

Following the transmission E202, the communication is routed in a conventional manner to an interconnection equipment of the part leg2 as illustrated in FIG. 2: equipment of the MGCF type in the case of a circuit technology or an NBI type equipment in the case of VoIP technology. This equipment is associated with the number TSAN.

During a step E204, the MGCF or NBI equipment associated with the number TSAN transmits the incoming communication, for example in SIP protocol, towards the server S and more specifically the B2BUA server.

During a step E206, the B2BUA server consults the memory of the device D by providing as input key the number Abis present in the "forwarding number" field of the SIP INVITE message, for example in a header of the SIP Diversion and/or History-Info type.

During a step E208, the server S and more specifically its B2BUA server obtains from the device D the certified identity A corresponding to the terminal T1 and the name of the operator managing this number A.

During a step E210, the server S and more specifically its B2BUA server determines based on the identified operator, the interconnection equipment of the part leg1 making it possible to contact the input equipment of this operator at the lowest time and cost, this equipment being of the MGCF type in case of circuit technology or of the NBI type in case of VoIP technology. The server S can determine (E210) this equipment by preconfigured routing tables or by consultation of an NPS portability server of the country in which the number A is assigned.

During a step E212, the server S and more specifically its HTTPS web client sends to the notification platform S_APP associated with the operating system of the terminal T1 (for example Apple IOS or Google Android, registered trademarks), a notification message which notifies of a presentation of a future communication intended for the non-certified identity Abis.

The platform S_APP transmits during a step E214 this notification to the application APP. The notification contains the calling number B, the number Abis or a technical identifier associated with the number Abis so as to inform in advance that the next communication that the application APP will receive via the application interfaces of the terminal T1 must be related to the context of the non-certified identity Abis and not of the certified identity A. The notification can use a unique Token representing the application of the terminal T1.

During a step E216, the server S routes the incoming communication in a conventional manner up to the entry point of the network NET1, for example a GMSC type equipment in our example. As known, a reachability MSRN number of the terminal T1 attached on a V-MSC switch is obtained, by querying an HLR database which itself contacts the V-MSC switch. The GMSC equipment routes, for example in ISUP/BICC protocol, the incoming communication towards the V-MSC switch which itself presents the communication to the terminal T1 according to the Call Control protocol and via a CC-Setup message by providing the calling number B.

During a step E218, the terminal T1 receives the communication and notifies, via its application interfaces, the application APP which restores the communication according to parameters associated with the non-certified identity Abis.

Figure 7:
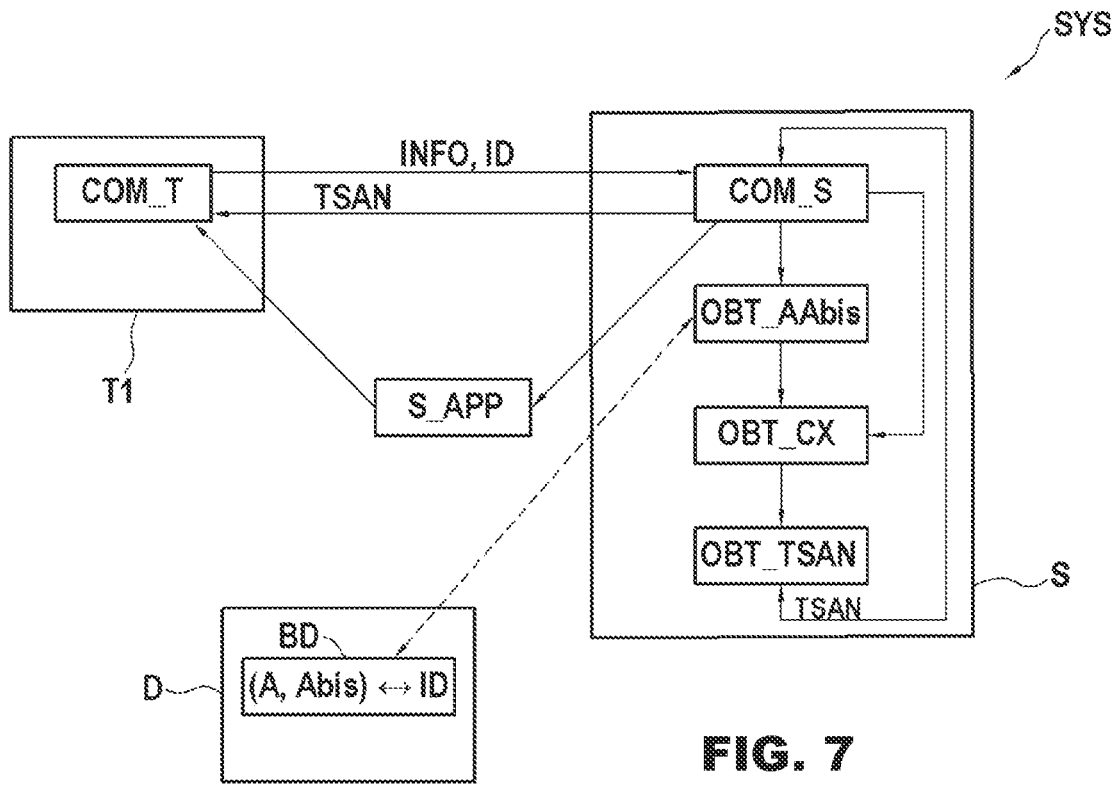
FIG. 7 represents a functional architecture, according to one particular embodiment, of a communication system.

FIG. 7 represents a functional architecture, according to one embodiment of the disclosed technology, of a proposed communication system SYS.

The system SYS includes the terminal T1, the device D and the server S.

The server S is configured to establish a communication between two terminals T1 and T2. The server S comprises:
  communication means COM_S configured to receive, from the first terminal T1 using a first calling identity A, a request comprising the information INFO on the connection of the first terminal T1 and the identifier ID of the first terminal T1;
  a module OBT_AAbis for obtaining, from a database and by using the identifier ID, a pair of calling identities (A, Abis) comprising one certified (A) and one non-certified (Abis), the pair comprising the first calling identity A and the second calling identity Abis;
  a module OBT_CX for determining, from one of said calling identities (A) and from the information on the connection INFO, a connectivity mode of the first terminal T1; and
  a module OBT_TSAN for determining, depending on the connectivity mode, the routable number TSAN on which the first terminal T1 can send a communication to the server S, the server being configured to route the communication towards the second terminal T2 by presenting a calling identity of the pair (A, Abis);
  the communication means COM_S being configured to send the routable number TSAN to the first terminal T1.

The communication means COM_S are further configured to send (step E212 in FIG. 6) the notification message to the notification platform S_APP, to notify of a presentation of a future communication intended for the non-certified identity Abis.

The device D comprising a module BD configured to record in a memory at least one identifier ID associated with a pair of calling identities (A, Abis) of a terminal T1, comprising one certified (A) and one non-certified (Abis).

The terminal T1 comprises communication means COM_T configured to:
  send to the server S a request comprising the information INFO on the connection of the terminal T1 and the identifier ID of the terminal T1;
  receive from the server S the routable number TSAN on which the terminal T1 can send a communication to the server S, the server being configured to route the communication towards the second terminal T2 by presenting a calling identity of a pair (A, Abis) associated with the identifier ID, the pair comprising a certified calling identity (A) and an non-certified calling identity (Abis) of the terminal T1; and
  send a communication to the routable number TSAN.

The communication means COM_T are further configured to receive (step E214 in FIG. 6) the notification message from the notification platform S_APP, which notifies of a presentation of a future communication intended for the non-certified identity Abis.

Figure 8:
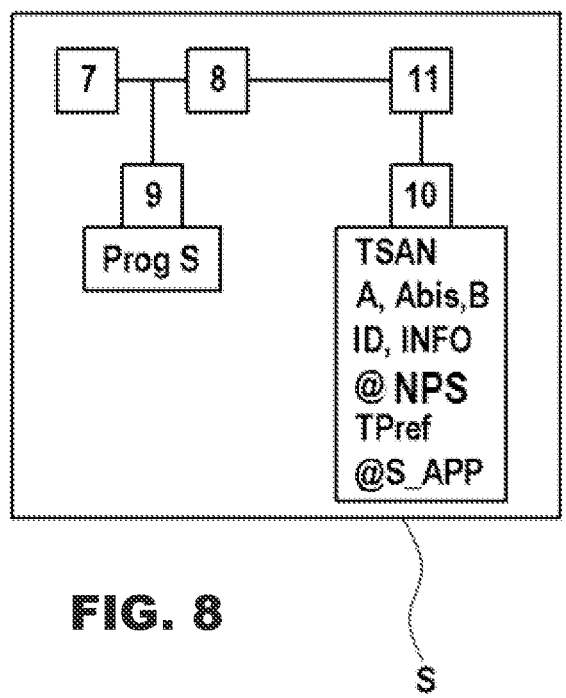
FIG. 8 represents a hardware architecture of a server according to one particular embodiment.

In the embodiments described here, the server S has the hardware architecture of a computer, as illustrated in FIG. 8.

The architecture of the server S comprises in particular a processor 7, a random access memory 8, a read only memory 9, a non-volatile flash memory 10 in a particular embodiment, as well as communication means 11. Such means are known per se and are not described in more detail here.

The read only memory 9 of the server S constitutes a recording medium in accordance with the disclosed technology, readable by the processor 7 and on which a computer program ProgS in accordance with the disclosed technology is recorded.

The memory 10 of the server S allows recording variables used for the execution of the steps of the method for establishing a communication as described previously. These variables comprise for example a list of routable numbers TSAN, the identities A and Abis of the terminal T1 and the identity B of the terminal T2, the technical identifier(s) ID assigned to the terminal T1, the information INFO on the connection of the terminal T1, at least one address of an NPS server, and the address of the platform S_APP. The memory 10 of the server S also allows recording a routing table TPref, for example based on a prefix of a number, to implement the step E126 described with reference to FIG. 3bis and/or step E210 described with reference to FIG. 6 in order to determine the best interconnection equipment to be used to reach this number, for example when a connection to an NPS server is not possible.

The computer program ProgS defines functional and software modules, configured here to establish a communication. These functional modules rely on and/or control the aforementioned hardware elements 7-11 of the server S.

Figure 9:
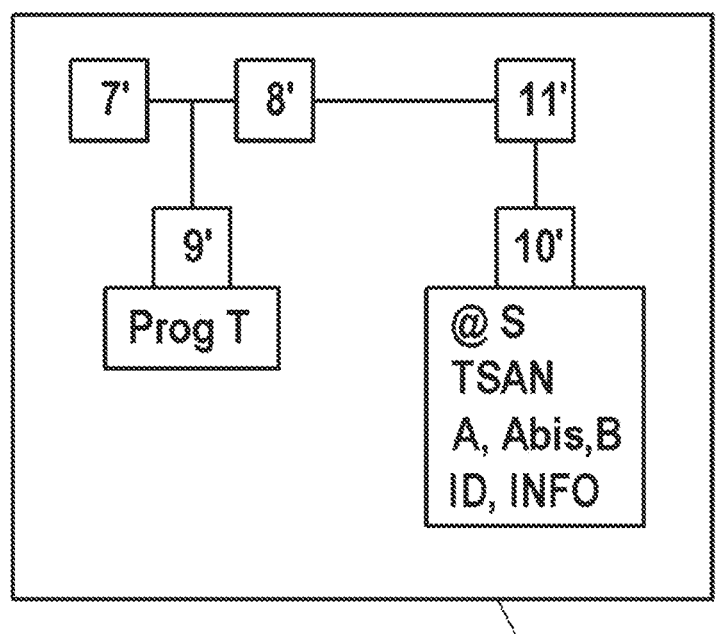
FIG. 9 represents a hardware architecture of a terminal according to one particular embodiment.

In the embodiments described here, the terminal T1 has the hardware architecture of a computer, as illustrated in FIG. 9.

The architecture of the terminal T1 in particular comprises a processor 7', a random access memory 8', a read only memory 9', a non-volatile flash memory 10' in a particular embodiment, as well as communication means 11'. Such means are known per se and are not described in more detail here.

The read only memory 9' of the terminal T1 constitutes a recording medium in accordance with the disclosed technology, readable by the processor 7' and on which a computer program ProgT in accordance with the disclosed technology is recorded.

The memory 10' of the terminal T1 allows recording variables used for the execution of the steps of the communication method as described above. These variables comprise for example an address of the server S, a routable number TSAN provided by the server S, the identities A and Abis of the terminal T1 and the identity B of the terminal T2, the technical identifier(s) ID assigned to the terminal T1 and the information INFO on the connection of the terminal T1.

The computer program ProgT defines functional and software modules, configured here to implement the communication method. These functional modules rely on and/or control the aforementioned hardware elements 7'-11' of the terminal T1.

What is claimed is:

1. A method for establishing a communication between a first terminal and a second terminal, the method being implemented by a server and comprising:
    receiving, from the first terminal using a first calling identity, a request comprising: information on a connection of the first terminal to a communication network; and an identifier of the first terminal;
    obtaining, from a database and by using the identifier, a pair of calling identities comprising one certified identity and one non-certified identity, the pair of calling identities comprising the first calling identity and a second calling identity;
    determining, from one of the calling identities and from the received information on the connection of the first terminal to the communication network, a connectivity mode of the first terminal to the communication network;
    determining, depending on the determined connectivity mode of the first terminal to the communication network, a routable number associated with the server, the server being configured to receive a communication intended for the routable number emitted by the first terminal and to route the communication towards the second terminal by presenting a calling identity of the pair of calling identities; and
    sending the determined routable number associated with the server to the first terminal.

2. The method of claim 1, wherein the request comprises a called number, the method further comprising:
    recording in a memory, for a given duration, the called number in association with the pair of calling identities; and
    after receiving a communication emitted with the first calling identity, obtaining the called number and the second calling identity from the memory; and
    routing the communication towards the called number by presenting, according to a criterion selected by a user of the first terminal, the first or the second calling identity of the pair of calling identities.

3. The method of claim 1, wherein the connectivity mode of the first terminal corresponds to a connectivity of the first terminal to its home network or to a visited network and/or to a connectivity in circuit technology or in Voice over Internet Protocol (VoIP) technology.

4. The method of claim 1, wherein the determined connectivity mode represents a connectivity of the first terminal to its home network, the routable number being a number assigned in a same geographical charging zone as that of the home network.

5. The method of claim 1, wherein the determined connectivity mode represents a connectivity of the first terminal to a visited network in circuit technology, the routable number being a number assigned in a same geographical charging zone as that of the visited network.

6. The method of claim 1, wherein the determined connectivity mode represents a connectivity of the first terminal to a visited network in VoIP technology according to a Local Break Out (LBO) type roaming model and under an agreement of roaming in VoIP between the operators of the home and visited networks, the routable number being a number assigned in a same geographical charging zone as that of the visited network.

7. The method of claim 1, wherein the determined connectivity mode represents a connectivity of the first terminal to a visited network in VoIP technology according to an S8 Home Routed (S8HR) type roaming model and under an agreement of roaming in VoIP between the operators of the home and visited networks, the routable number being a number assigned in the same geographical charging zone as that of the home network.

8. The method of claim 1, further comprising:
    after receiving a communication intended for the non-certified identity of the first terminal, searching in the database for this non-certified identity, and, upon a determination that this non-certified identity is present in the database:
        obtaining the certified identity associated in the database with the non-certified identity;
        sending to the certified identity a notification alerting of a future communication emitted to the non-certified identity, the notification comprising the calling number of the communication; and
        routing the communication towards the certified identity.

9. The method of claim 8, further comprising selecting interconnection equipment in a country in which the certified identity is assigned, the equipment being selected from a routing table and/or a portability base of the Number Portability Server (NPS) type, the communication being routed via the interconnection equipment.

10. A method for communication, the method implemented by a terminal, the method comprising:
    sending, to a server, a request comprising: information on a connection of the terminal to a communication network; and an identifier of the terminal;
    receiving, from the server, a routable number associated with the server and on which the terminal can send a communication to the server, the communication being routed towards a second terminal by presenting a calling identity among a pair of calling identities associated with the identifier, the pair of calling identities comprising a certified calling identity and a non-certified identity of the terminal; and
    sending a communication to the received routable number associated with the server.

11. The method of claim 10, further comprising:
receiving a notification alerting of a future communication on a number, the notification comprising the calling number of the communication;
selecting, for the calling number and for a given duration, communication presentation parameters; and
after receiving a communication whose calling number is the calling number contained in the notification, presenting the communication according to the selected parameters.

12. A non-transitory computer readable medium having stored thereon instructions which, when executed by a processor, cause the processor to implement the method of claim 10.

13. A non-transitory computer readable medium having stored thereon instructions which, when executed by a processor, cause the processor to implement the method of claim 1.

14. A server configured to establish a communication between a first and a second terminal, the server comprising:
communication means configured to receive, from the first terminal using a first calling identity, a request comprising: information on a connection of the first terminal to a communication network; and an identifier of the first terminal;
a module for obtaining, from a database and by using the identifier, a pair of calling identities comprising one certified identify and one non-certified identity, the pair comprising the first calling identity and a second calling identity;
a module for determining, from one of the calling identities and from the received information on the connection of the terminal to the communication network, a connectivity mode of the first terminal to the communication network; and
a module for determining, depending on the determined connectivity mode of the first terminal to the communication network, a routable number associated with the server, the server being configured to receive a communication intended for the routable number emitted by the first terminal and to route the communication towards the second terminal by presenting a calling identity of the pair of calling identities;
the communication means being configured to send the determined routable number associated with the server to the first terminal.

15. A terminal comprising communication means configured to:
send to a server a request comprising: information on a connection of the terminal to a communication network; and an identifier of the terminal;
receive from the server a routable number associated with the server and on which the terminal can send a communication to the server, the communication being routed towards a second terminal by presenting a calling identity of a pair of calling identities associated with the identifier, the pair comprising a certified calling identity and an non-certified calling identity of the terminal; and
send a communication to the received routable number associated with the server.

* * * * *